US007437220B2

(12) United States Patent
Stefani

(10) Patent No.: US 7,437,220 B2
(45) Date of Patent: Oct. 14, 2008

(54) SYSTEMS AND METHODS FOR CREW INTERACTION AND COORDINATION USING PORTABLE ELECTRONIC DATA STORAGE AND DISPLAY DEVICES

(75) Inventor: Rolf Stefani, West River, MD (US)

(73) Assignee: Arinc, Inc., Annapolis, MD (US)

( * ) Notice: Subject to any disclaimer, the term of this patent is extended or adjusted under 35 U.S.C. 154(b) by 869 days.

(21) Appl. No.: 10/919,318

(22) Filed: Aug. 17, 2004

(65) Prior Publication Data

US 2006/0041340 A1 Feb. 23, 2006

(51) Int. Cl.
*G01C 23/00* (2006.01)

(52) U.S. Cl. .............................................. 701/3; 701/36

(58) Field of Classification Search ..................... 701/1, 701/3, 4, 36, 29

See application file for complete search history.

(56) References Cited

U.S. PATENT DOCUMENTS

| | | | | |
|---|---|---|---|---|
| 5,916,297 | A | 6/1999 | Griffin, III et al. | |
| 6,236,913 | B1 | 5/2001 | Bomans et al. | |
| 6,381,519 | B1 | 4/2002 | Snyder | |
| 6,414,914 | B1 * | 7/2002 | Lee et al. | 369/30.05 |
| 6,573,914 | B1 | 6/2003 | Pauly et al. | |
| 7,149,612 | B2 * | 12/2006 | Stefani et al. | 701/35 |
| 2002/0118166 | A1 | 8/2002 | Roux | |
| 2003/0003872 | A1 | 1/2003 | Brinkley et al. | |
| 2003/0069015 | A1 | 4/2003 | Brinkley et al. | |

* cited by examiner

*Primary Examiner*—Richard M. Camby
(74) *Attorney, Agent, or Firm*—Oliff & Berridge, PLC

(57) ABSTRACT

To facilitate crew coordination and interaction using portable electronic data storage and display devices, automated and interactive capabilities allow any of several crew members to forward information regarding a page of data which the crew member has selected using the user interface of his or her portable electronic data storage and display device to the portable electronic data storage and display device of any other crew member or all other crew members particularly those who, due to task loading, may be unable to immediately employ the data manipulation and control functions resident in their own portable electronic data storage and display device. Data thus displayed is available for independent or interactive manipulation as though it had been locally rather than remotely selected.

14 Claims, 7 Drawing Sheets

SYSTEMS AND METHODS FOR CREW INTERACTION AND COORDINATION USING PORTABLE ELECTRONIC DATA STORAGE AND DISPLAY DEVICES

BACKGROUND OF THE INVENTION

1. Field of Invention

This invention is directed to systems and methods for crew interaction and coordination in task-loaded environments using portable electronic data storage and display devices.

2. Description of Related Art

Portable electronic data storage and display devices, such as, for example, electronic notebooks and like handheld devices, present a tremendous capacity to provide a user with readily available information that was previously found only in large, cumbersome technical or reference libraries of printed publications. Use of these portable electronic data storage and display devices in many highly task-loaded environments is becoming commonplace. The capabilities of such devices are limited only by their internal data storage capacities and specific functionality for manipulating pages of data resident in the device. Many of these portable electronic data storage and display devices in common use today are oriented to specific sets of tasks or specific usable purposes. One such example is the Electronic Flight Bag, or "EFB," which is gaining wide acceptance with individual cockpit flight crew members, particularly in large commercial airline, military transport and general aviation aircraft with multi-place cockpits.

In specifically task-oriented operations, these devices, in addition to their capacity for storage and display of tremendous technical or reference libraries of information, provide a platform to enable other tasks to be automated. In EFBs, for example, checklists are made interactive and other data form fill type needs such as performing weight and balance and/or performance calculations as will be referred to in greater detail below, may be provided.

Conventionally, each member of a commercial airline, military transport or general aviation aircraft cockpit flight crew carries with them, into the cockpit of the aircraft, a large "flight bag," which is a catalog case full of normal procedural and emergency procedures checklists, aircraft operating manuals including tables of operating limitations, domestic and international navigational charts (as appropriate), and/or other pertinent or required inflight information publications and the like. Often, the individual cockpit flight crew member's routine includes pre-arranging selected portions of this extensive library of all required printed materials in an anticipated order of need. As such, specific references required for pre-flight, start, taxi, takeoff, departure, inflight/enroute navigation, arrival, approach, landing, taxi, shutdown and post-flight are readily available substantially in the order in which it is anticipated that they will be required.

Special and/or emergency procedures checklists and publications are often segregated and kept in a separate portion of each individual cockpit flight crew member's flight bag. Those publications to which quick access may be required during critical phases of flight are often segregated in this manner in order to minimize the time necessary for the individual cockpit flight crew member to access the required information, thereby coincidentally minimizing the amount of time which the individual cockpit flight crew member's attention is diverted from concentrating principally on controlling the aircraft.

Additionally, there are many repetitive tasks which often require the recall, review and verification of individually mandated checklists in order to ensure and record completion. Also, individual cockpit flight crew members must routinely fill out and/or accept a number of standard forms for each flight. Each of these repetitive or routine tasks requires significant interaction between individual cockpit flight crew members in order to ensure task completion.

Further, based on mandated requirements for control of an aircraft, there are times, during certain critical phases of flight, when an individual flight crew member is unable to remove, and, in fact, is proscribed from removing, his or her hands from the controls of the aircraft. Thus, for example, it is at times impossible or at least very difficult for the cockpit flight crew member to access separately required publications from the reference library of materials carried onboard the aircraft. In such instances, a typical flight crew coordination scenario involves a pilot in control of the aircraft at the specific time requesting of another cockpit flight crew member the specific publication required for that phase of flight. The cockpit flight crew member to whom the request is directed then selects the appropriate publication from any available library of references (his or her own, that of the pilot in control, or that of another cockpit flight crew member), opens the selected publication to the correct page (or folds the chart to display the currently required information) and then manually places the publication within the view of the pilot in control of the aircraft for his or her review and use.

Against this conventional set of circumstances, the use of microprocessor based portable electronic data storage and display devices, such as, for example, EFBs, is becoming more and more popular in commercial airline, large transport, and general aviation. The introduction of EFBs into the cockpits of commercial airline, multi-place military transport and other aircraft provides an automated and interactive library of publications in electronic format to replace the conventional flight bag full of checklists, charts, publications and the like. As with the previous printed library of publications, each individual cockpit flight crew member carries all of the required reference materials with regard to the operation and navigation of the aircraft; however, now these materials are contained in an electronic notepad or like portable electronic data storage and display device.

There are, however, certain procedural modifications which the introduction of these devices mandate, or separately facilitate. It should be understood that, in a multi-crew member cockpit, individual cockpit flight crew members' EFBs are commonly mounted on the outboard sides of each principal flight crew member's aircraft control station, e.g., on the windshield rail or console to the left of the left or pilot's station, and in a like location to the right of the right or co-pilot's station. This placement, it should be recognized, places an individual cockpit flight crew member's EFB out of reach and/or view of the other cockpit flight crew member.

SUMMARY OF THE INVENTION

A system and method is needed to allow an individual cockpit flight crew member not exercising immediate control over the aircraft during a given phase of flight to be able to interact with the EFBs of the other flight crew members, particularly the EFB of the individual cockpit flight crew member who is in immediate control of the aircraft and therefore must keep his or her hands on the aircraft controls during the given phase of flight. This capability should closely replicate the conventional flight crew interaction and coordination where a co-pilot, for example, produces, selects, and provides to the pilot the required reference publication for the pilot's immediate use.

Additionally, a system and method could be advantageously provided which provides increase capability for individual cockpit flight crew members to interact. For example, when an individual cockpit flight crew member displays a checklist, which could be configured within the portable electronic data storage and display device to be interactive, each of the other individual cockpit flight crew members may benefit from having the same checklist for that required phase of flight automatically displayed. With such capability, the entire cockpit flight crew can interact in a manner whereby each individual cockpit flight crew member can execute a certain step of a checklist and then verify completion of that step in the task in a manner such that the status of the checklist is consistently updated and supplied to each of the other individual cockpit flight crew members.

Embodiments of this invention provide systems and methods for crew interaction and coordination in task-loaded environments, such as, for example, cockpit flight crew coordination and interaction in the cockpits of commercial airline, military transport and general aviation aircraft with multi-place cockpits, using portable electronic data storage and display devices.

Embodiments of this invention may provide an interactive capability to allow any of several crew members the ability to forward information from one individual's portable electronic data storage and display device, such as, for example, an EFB, for display on the portable electronic data storage and display device of any or all other crew members with whose portable electronic data storage and display devices the first portable electronic data storage and display device is in communication through a data transfer connection.

Embodiments of this invention may provide a method for cockpit flight crew coordination of EFB activity and data manipulation across a cockpit-installed private local area network.

Embodiments of this invention may provide systems and methods to perform Cockpit Resource Management (CRM) review with information on cockpit flight crew member electronic interaction, for example, being recorded, stored and made available for a number of beneficial purposes such as, for example, efficiency analysis, procedures training, event reconstruction, mishap investigation or any other like beneficial purpose. A capability may be provided to log and archive all data manipulation and transfer steps internal to and between the EFBs of individual cockpit flight crew members.

Embodiments of this invention may provide a specific capability to facilitate flight crew interaction and coordination using automated tools and data communications onboard aircraft when using electronic publications, charts and other like references.

Embodiments of this invention may further provide an automated and interactive method for causing information that is displayed on one individual crew member's portable electronic data storage and display device, e.g., a co-pilot's EFB, to be selectively displayed on the portable electronic data storage and display device of any other individual crew member, or broadcast to the portable electronic data storage and display devices of the entire crew at the same time, e.g., a pilot's EFB (and any, or all, other crew members' EFBs, if desired) with all necessary data as required, without the need of receiving a data request through the user interface of the second portable electronic data storage and display device. This is particularly useful when, for example, a pilot requires data but is unable to remove his or her hands from the controls of an aircraft to specifically and physically initiate the data request through manipulation of the input interface on his or her own portable electronic data storage and display device.

Embodiments of this invention may provide systems and methods whereby any flight crew member can forward or "PUSH" information regarding the data reference page displayed on his or her EFB individually to any, or alternatively to all, other cockpit flight crew member(s).

It should be appreciated that not only can an individual crew member select a static page of data to be displayed, but additionally any individual crew member can initiate crew member interaction for, for example, executing checklists, filling out forms or the like, by selecting a dynamically interactive data reference page, which not only displays certain required data but also initiates an interactive routine whereby steps in a checklist, or blanks in a form, are provided to be completed, and that individual crew member can then forward or "PUSH" the information regarding that interactive data reference page displayed on his or her portable electronic data storage and display device individually to any, or alternatively to all, other crew member(s). In this manner, individual inputs to such interactive data reference pages by any individual crew member will be displayed for the entire crew to review on each of their individual portable electronic data storage and display devices.

In various exemplary embodiments of the systems and methods according to this invention, individual cockpit flight crew members can select from among the thousands of pages of information available in electronic form in that individual cockpit flight crew member's EFB. The individual flight crew member, having selected a specific page of data, can then, using the systems and methods according to this invention, forward information regarding the specific page of data which that cockpit flight crew member is viewing across the cockpit-installed private local area network to the EFB display device of one or more of the other individually selectable cockpit flight crew members. The systems and methods according to this invention then provide the capability for the receiving EFB to process the information provided and, in response to the input from a remote transmitting EFB, display on the receiving EFB, the same page of data that is being viewed at the remote transmitting EFB.

It is important to note that although embodiments of the systems and methods according to this invention are described as including a hard-wired communications link, e.g., a cockpit-installed private local area network in the cockpit of a multi-place, multi-crew member aircraft, the embodiments according to this invention are not limited to such hard-wired installations. It should be appreciated that data transfer between EFB units could occur by any means adapted for such information flow between portable or hand-held electronic data storage and display devices such as EFBs. These data transfer capabilities can include, for example, permanently-installed cable connections, temporary cable unit-to-unit connections, wireless and/or infra-red data transfer, other data transfer capabilities or any combination of these appropriate to the user environment.

In various exemplary embodiments of the systems and methods according to this invention, safety is improved by minimizing the need for the individual cockpit flight crew member who is in control of the aircraft at a given time to be distracted in selecting alternative pages of data in his or her own EFB for display.

Further, it should be appreciated that the systems and methods according to this invention provide for substantially clear and unambiguous display of any interaction undertaken by one individual cockpit flight crew member with the system. Each separate individual cockpit flight crew member is therefore afforded the opportunity to monitor the data input of any, or all, other individual cockpit flight crew member(s) ensuring that no required step in a procedure, and no required blank in a form, for example, is missed.

Embodiments of this invention may provide an automated architecture designed as a complete network solution providing all installed EFBs access to each other and to other peripheral devices available in the cockpit of commercial, military and general aviation aircraft thereby bridging gaps in multi-place cockpit flight crew coordination based on the move to a paperless, or at least paper-reduced, cockpit.

Embodiments of this invention may provide systems and methods to guard against defocusing the pilot from the task of operating the aircraft safely by minimizing the necessity for the pilot to divert his or her attention from actual manipulation of the controls of the aircraft in order to find necessary navigational information or interactive normal or emergency procedures checklists keyed to critical phases of flight and other operational situations.

It should be appreciated that although the systems and methods described herein refer to the specific application of a multi-place, multi-crew member commercial airline, military transport or general aviation aircraft, the systems and methods according to this invention are not strictly limited to aviation-based information exchange capabilities. Rather, such devices, as adapted for use in other multi-person or multi-crew member high task-loading environments, are contemplated.

These and other features and advantages of the disclosed embodiments are described in, or apparent from, the following detailed description of the various exemplary embodiments of the systems and methods according to this invention.

BRIEF DESCRIPTION OF THE DRAWINGS

Various exemplary embodiments of the systems and methods according to this invention will be described, in detail, with reference to the following figures, wherein.

DETAILED DESCRIPTION OF PREFERRED EMBODIMENTS

The following description of various exemplary embodiments of systems and methods for enhancing cockpit flight crew interaction and coordination using EFBs will focus on a currently available EFB device and coordination via a cockpit-installed private local area network. However, it should be appreciated that the principles of this invention, as outlined and/or discussed below, can be equally applied to any hand-held electronic data storage and display device which can be adapted for multi-person or multi-crew member task coordination in high activity or high task-loading environments where a single individual may not be able, at a given point due to individual task loading (i.e., having a plurality of tasks assigned which must be handled nearly simultaneously), to manipulate his or her own individual portable electronic data storage and display device, thereby necessitating a system and method by which another individual team or crew member can forward information regarding data to be displayed directly to the portable electronic data storage and display device of the encumbered team or crew member for display of the data required to that individual.

Figure 1:
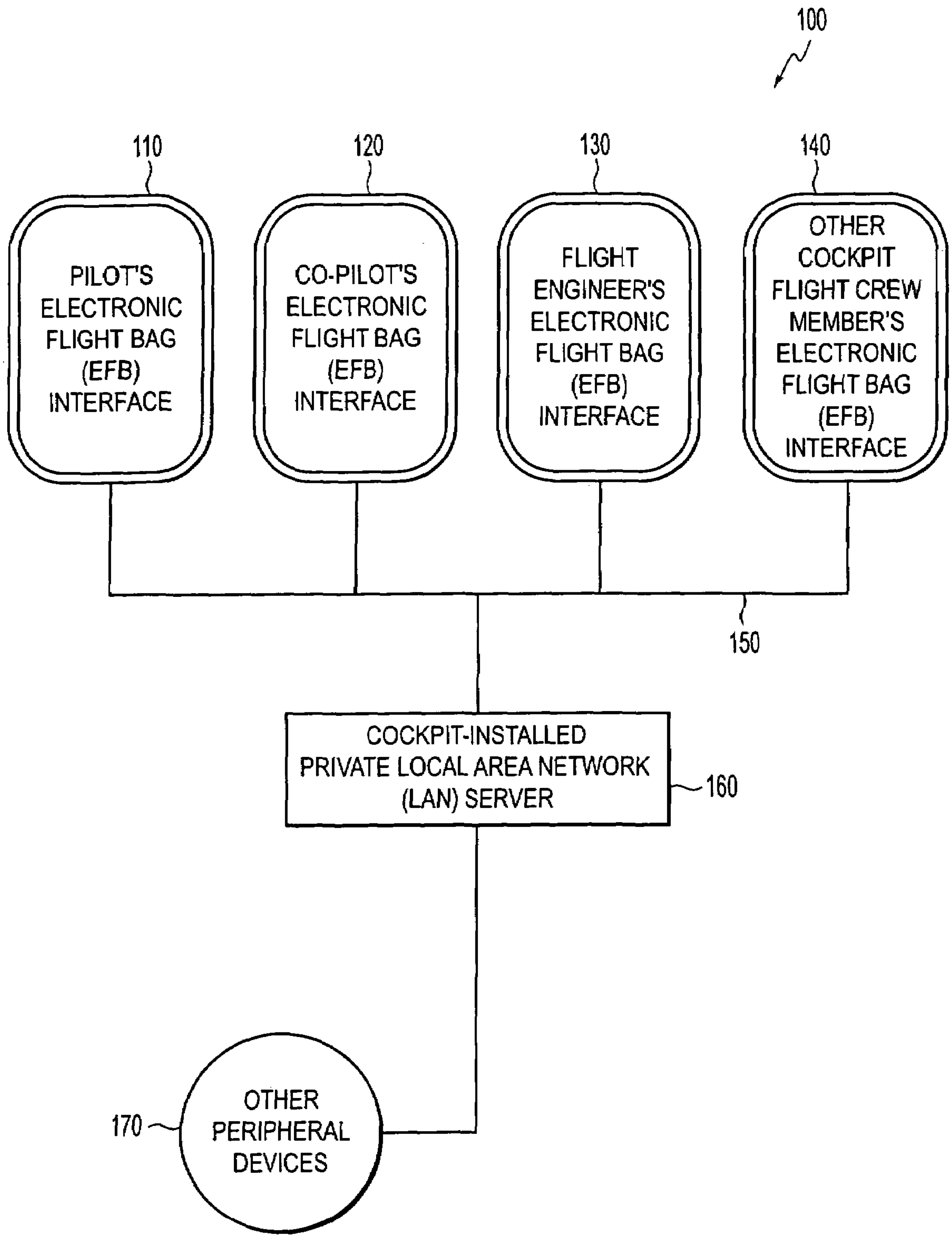
FIG. 1 illustrates an exemplary embodiment of a cockpit-installed private local area network usable with the systems and methods according to this invention.

FIG. 1 illustrates an exemplary embodiment of a cockpit-installed private local area network usable with the systems and methods according to this invention. As shown in FIG. 1, an exemplary embodiment of an electronic cockpit data communications suite 100 is provided.

In various exemplary embodiments, in order to accommodate the systems and methods according to this invention, a cockpit data communications suite 100 includes multiple interfaces 110/120/130/140 to accommodate, and provide a data communications link to, individual cockpit flight crew members' EFBs or other like portable electronic data storage and display devices. Such interfaces are individually connected via an exemplary, in this instance cockpit-installed, private local area network data and control bus 150. This data and control bus may optionally include a private local area network server 160 or other like optional information storage and data processing unit or device external to any individual cockpit flight crew member's EFB or other like portable electronic data storage and display device. Such optional information storage and data processing unit or device is usable, for example, to record, log and/or otherwise archive data regarding each occurrence of interaction between individual cockpit flight crew members' EFBs. Such stored information then is available, for example, for CRM review for such beneficial purposes as efficiency evaluation, procedures training, event reconstruction, mishap investigation or other like beneficial purpose.

In various exemplary embodiments, the data and control bus 150 can also provide a communications link to a series of other peripheral devices 170 (depicted generally and collectively) such as, for example, external communications antennas, hard copy printers, digital data recording devices, and any other peripheral device which could be advantageously connected into the cockpit-installed private local area network. While depicted and discussed briefly in order to outline the scope of the capability of the cockpit-installed private local area network, further discussion of the capabilities and inclusion of such other peripheral devices is beyond the scope of the embodiments described herein.

Further, while depicted and discussed as a hard-wired, apparently permanent installation, it should be appreciated that the data communications connection provided between individual EFB interfaces can be any other known or later-developed connection which supports data transfer between portable electronic data storage and display devices, wired (including optical waveguides) or wireless.

Figure 2:
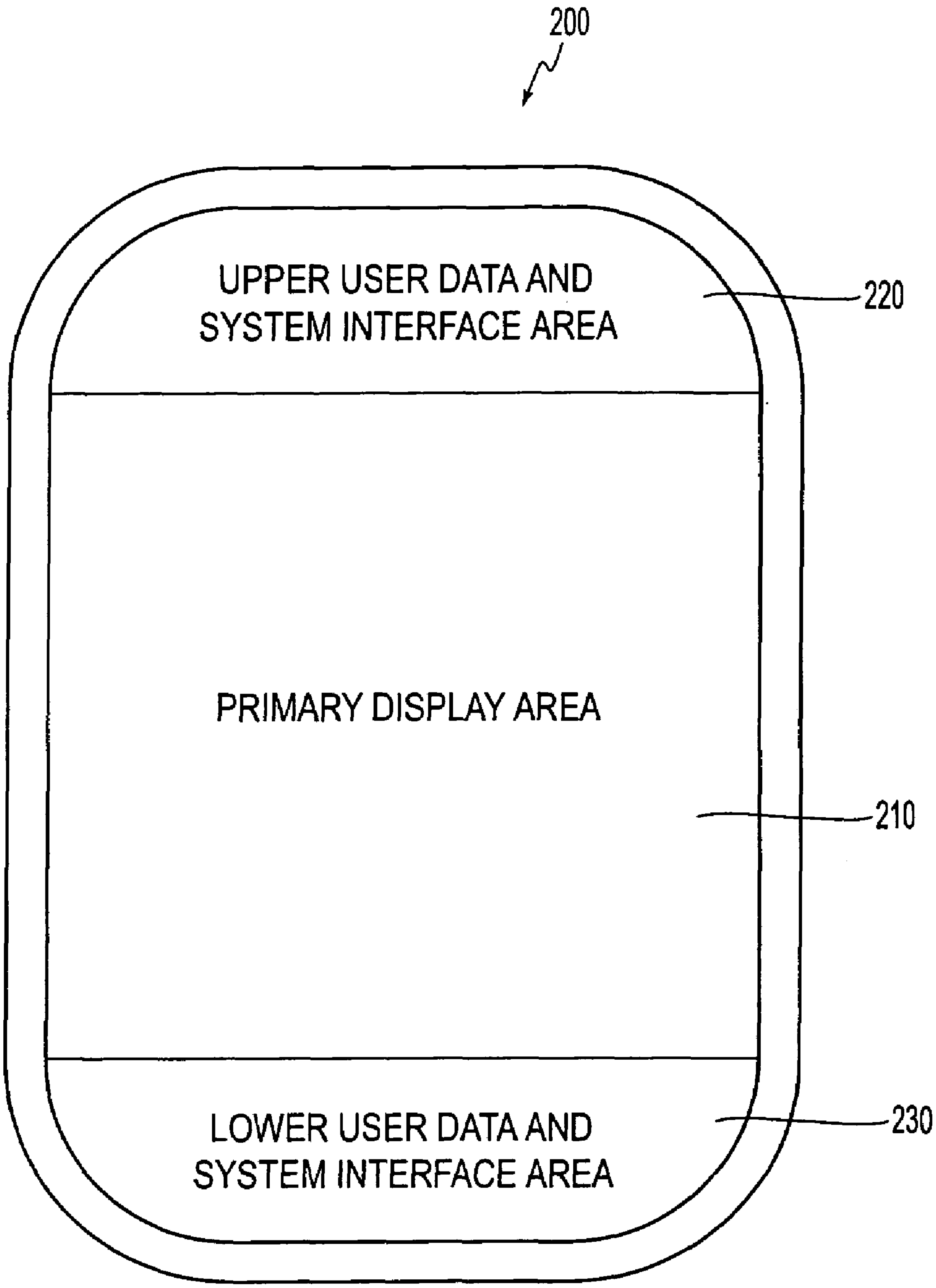
FIG. 2 illustrates an exemplary embodiment of an EFB as an example of a portable electronic data storage and display device usable with the systems and methods according to this invention.

FIG. 2 illustrates an exemplary embodiment of an EFB 200 as an example of a portable electronic data storage display device usable with the systems and methods according to this invention. As shown in FIG. 2, an exemplary embodiment of an EFB 200 includes a primary data display area 210, an upper user data and system interface area 220 and a lower user data and system interface area 230. The upper and lower user data and system interface areas 220,230, located in an exemplary manner in the top and bottom three quarters of an inch of the overall display area, may be ordinarily hidden and are dedicated to receive user input and present options to a user for manipulating the data to be displayed on the primary display area 210 of the EFB. These upper and lower user data and system interface areas 220,230 are preferably normally hidden allowing the primary display area 210 to extend to the limits of the overall display area. When the overall display area of the EFB is touched in either of the upper and lower user data and system interface areas 220,230, menu choices are presented to the individual cockpit flight crew member facilitating manipulation and control of the data to be displayed on the EFB.

The primary display area 210, which, as noted above, generally overlaps the upper and lower user data and system interface areas 220,230, can be used to display any one of tens of thousands of static (e.g., text and still pictures), dynamic (e.g., video and/or audio), and/or interactive (e.g., checklists and forms) pages of data stored in the reference library of the EFB. Such pages of data displayed normally in the primary display area 210 include, for example, required checklists, aircraft operating manuals, navigation charts and/or publications and other like pages of reference materials required for operation and navigation of the aircraft under normal and emergency conditions. An individual cockpit flight crew member can simply review the information presented which is critical to the immediate phase of flight. Alternatively, in the case of checklists, these are often available in an interactive manner such that, as individual steps in the checklist are completed, the individual cockpit flight crew member can “check-off” the step in an interactive manner by manipulating the display of the EFB. The resulting indication for the “check-off” of the step can then be displayed not only on the EFB of the individual cockpit flight crew member who verified accomplishment of the step, but the “check-off” indication can be immediately and coincidentally displayed on the EFBs of the other individual cockpit flight crew members who had the checklist up for display at that given time based on the interaction of the EFBs and communication therebetween which will be described in more detail below.

Figure 3:
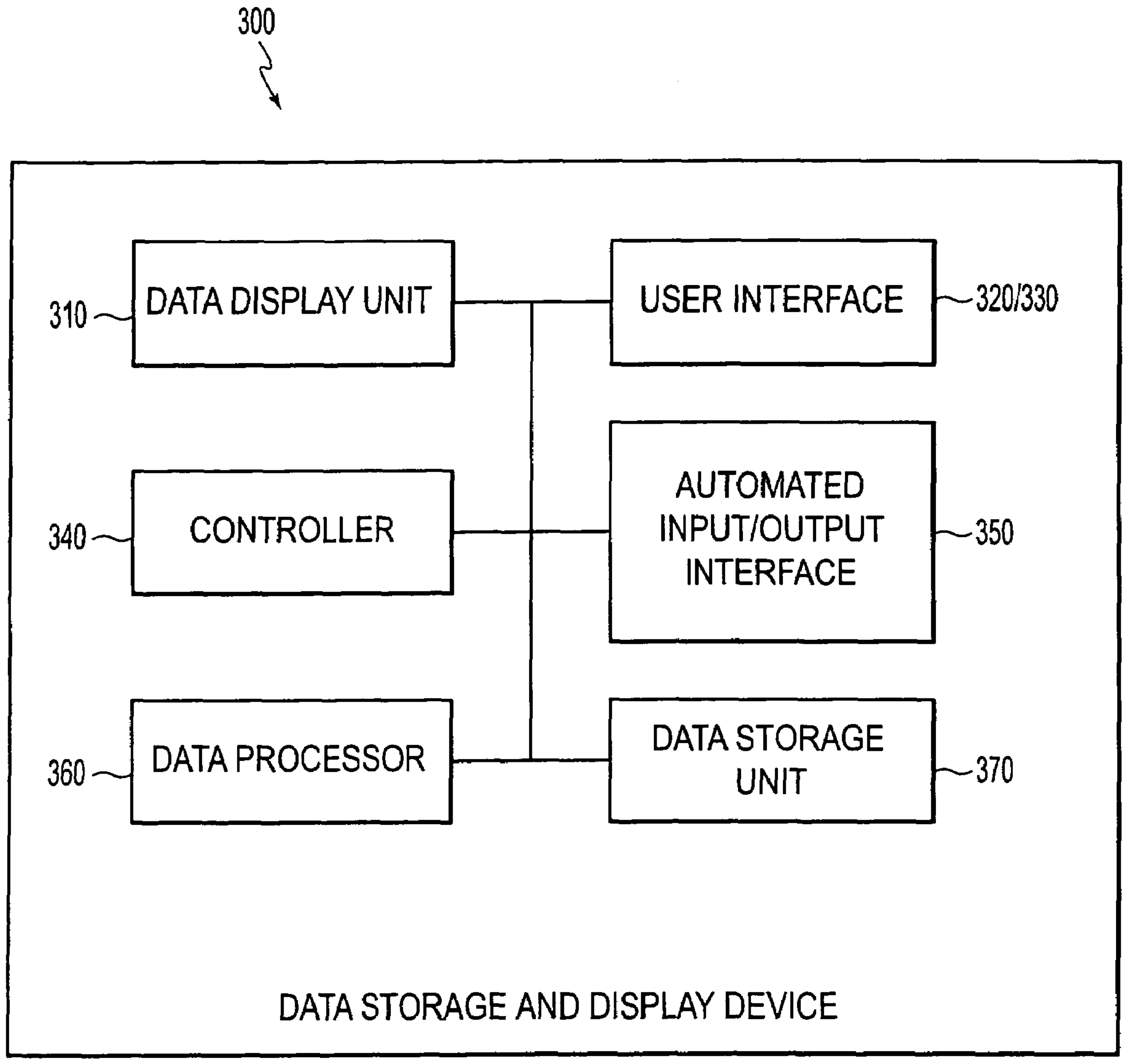
FIG. 3 illustrates a block diagram of an exemplary embodiment of a generic portable electronic data storage and display device, of which an EFB is one specific example, usable with the systems and methods according to this invention.

FIG. 3 is a block diagram of an exemplary embodiment of a generic portable electronic data storage and display device 300, of which an EFB is one specific example, usable with the systems and methods according to this invention. In the discussion which follows, a generic portable electronic data storage and display device 300 is described, with reference to FIG. 3. Then below, with reference to FIGS. 4-6, the description will return to an exemplary embodiment of an EFB as an example of a portable electronic data storage and cockpit-installed interface as an example of a data transfer connection. The portable electronic data storage and display device 300 includes a data display unit 310, at least one user interface 320/330, a controller 340, a data input/output interface 350, a data processor 360, and a data storage unit 370 which are interconnected by a data/control bus 380.

In various exemplary embodiments of the systems and methods according to this invention, at least two such portable electronic data storage and display devices 300 are provided with a data transfer device or connection between them depicted in an exemplary manner as the cockpit-installed private local area network 150 in FIG. 1. The data transfer connection is made through the data input/output interfaces 350 of the individual portable electronic data storage and display devices 300. The data processor 360 is provided to process user inputs received by the at least one user interface 320/330, to process data for transmission through the data input/output interface 350, and to respond to data received from the data input/output interface 350 for display of data stored in the data storage unit 370 on the data display unit 310.

In various exemplary embodiments of the systems and methods according to this invention, information regarding the data displayed on one portable electronic data storage and display device 300 (hereafter designated 300(A)) is forwarded through the data input/output interface 350 of that portable electronic data storage and display device 300(A), based on user input specifically commanding such information transfer. The user input is provided through the at least one user interface 320/330 across the data transfer connection to a second portable electronic data storage and display device 300 (hereafter designated 300(B)). When the information regarding data selected on the first portable electronic data storage and display device 300(A) is received by the second portable electronic data storage and display device 300(B) through its own input/output interface 350, the information is processed by the data processor 360 in the second portable electronic data storage and display device 300(B) by executing an automated routine or circuit in the data processor 360 providing data display not initiated through the at least one user interface 320/330 of the second portable electronic data storage and display device 300(B), but rather initiated remotely through the at least one user interface 320/330 of the first portable electronic data storage and display device 300(A). The data processor 360 of the second portable electronic data storage and display device 300(B) selects the data to be displayed on the data display unit 310 of the second portable electronic data storage and display device 300(B) based on the information received from the first portable electronic data storage and display device 300(A). The second portable electronic data storage and display device 300 (B) is thus made to display data identical to that selected and optionally displayed on the first portable electronic data storage and display device 300(A) with no requirement or even opportunity for user input through the at least one user interface 320/330 of the second portable electronic data storage and display device 300(B).

It should be appreciated that preliminary display of the data on the first portable electronic data storage and display device 300(A) is preferable in order that, prior to transmission, the user of the first portable electronic data storage and display device 300(A) can independently confirm that the data displayed is, in fact, that which was requested. It should be further appreciated, however, that there are highly task-loaded environments where such confirmation is not required. Therefore, it is contemplated that selection of data to be transferred from a list of data available such as, for example, from a table of contents, or glossary of terms, or like list of data available, may be acceptable in certain applications of the systems and methods according to this invention.

Additionally, it should be appreciated that once the second portable electronic data storage and display device 300(B) is made to display data identical to that displayed on the first portable electronic data storage and display device 300(A), and that display reference page represents a checklist or other interactive display capability, the second portable electronic data storage and display device 300(B) is available, in addition to the first portable electronic data storage and display device 300(A) for the individual crew member in control of the second portable electronic data storage and display device 300(B) to manipulate the interactive display via the at least one user interface 320/330 of the second portable electronic data storage and display device 300(B). Data entered thereon will be immediately replicated on the display of the first portable electronic data storage and display device 300(A). In other words, once activated, the second portable electronic data storage and display device 300(B) would, in no way, have its functionality limited. The second portable electronic data storage and display device 300(B) would retain all of the normal functionality as if the original data display had been called up directly on the second portable electronic data storage and display device 300(B) rather than displayed based on information remotely provided from the first portable electronic data storage and display device 300(A).

Figure 4:
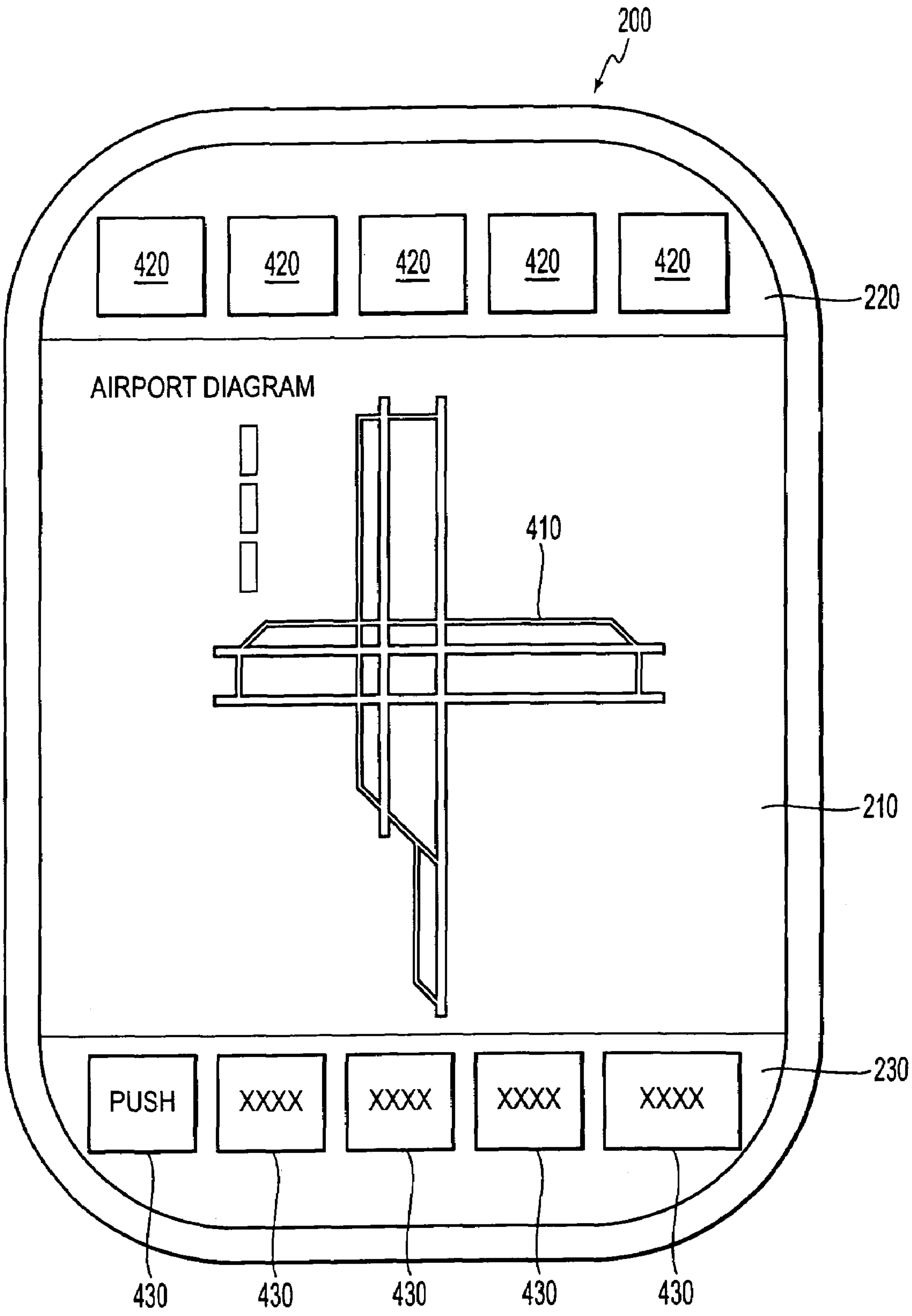
FIG. 4 illustrates a second view of an exemplary embodiment of an EFB as an example of a portable electronic data storage and display device usable with the systems and methods according to this invention.

FIG. 4 illustrates a second view of an exemplary embodiment of an EFB 200 as an example of a portable electronic data storage and display device usable with the systems and methods according to this invention. As shown in FIG. 4, an exemplary representative airport diagram 410 is shown as typical of the information which could be displayed in the primary data display area 210. Additionally, in this view of the exemplary embodiment of the EFB 200, the user, e.g., an individual cockpit flight crew member, has touched the EFB overall display screen in the upper and lower user data and system interface areas 220,230, and menu buttons 420,430 (in an exemplary manner, five each in the upper and lower user data and system interface areas 220,230) are presented. With these menu buttons 420,430, random in number and individually labeled as required to support specific tasks, the individual cockpit flight crew member can manipulate and control the data to be displayed on the EFB in order to display a specific data reference page which that individual cockpit flight crew member desires to view during that specific phase of flight, and alternatively to manipulate in an interactive manner the data reference page displayed.

In various exemplary embodiment of the systems and methods according to this invention, in at least one of the upper and lower user data and system interface areas 220,230, one or more of the menu buttons 420,430 displayed will be marked "PUSH" or some other like descriptive term (shown in exemplary manner on menu buttons 430). In the various exemplary embodiments of the systems and methods according to this invention, it is this PUSH button which is usable to initiate the information exchange operation between EFBs of the various cockpit flight crew members across the data transfer device or connection such as, for example, the cockpit-installed private local area network 150 depicted in FIG. 1, or other suitable data transfer, wired or wireless, connection as described above, in order to force display on a remote or receiving EFB of the same data reference page as is selected and optionally displayed on the currently user manipulated or transmitting EFB. Details of the information transfer between EFBs according to exemplary systems and methods of this invention are described also as method steps disclosed in paragraphs [0062] through [0076] below.

In various exemplary embodiments of the systems and methods according to this invention, the PUSH button could be provided elsewhere on the display device as a permanent or actual physical hardware button rather than a display initiated menu button.

Figure 5:
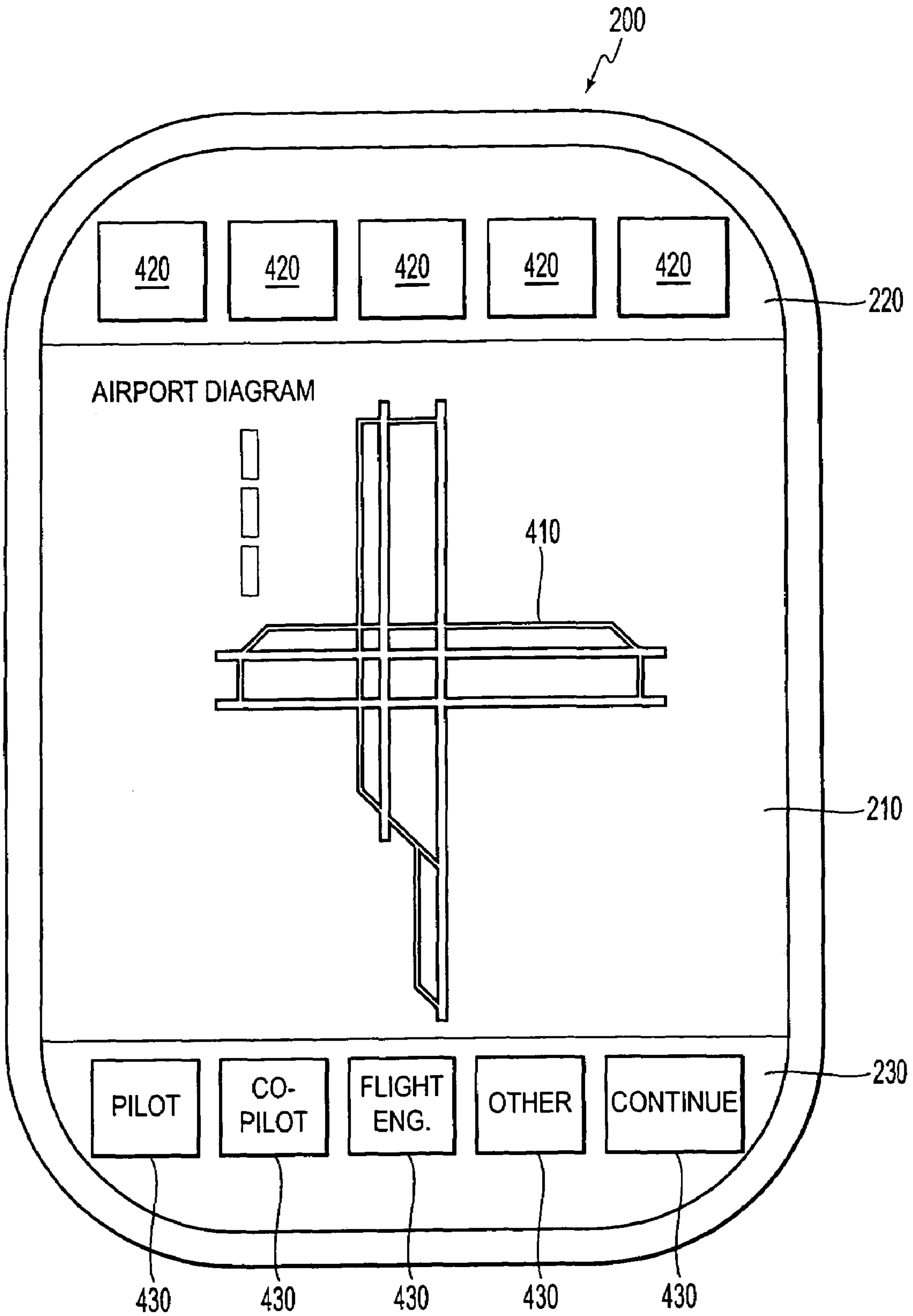
FIG. 5 illustrates a third view of an exemplary embodiment of an EFB as an example of a portable electronic data storage and display device usable with the systems and methods according to this invention.

FIG. 5 illustrates a third view of an exemplary embodiment of an EFB 200 as an example of a portable electronic data storage and display device usable with the systems and methods according to this invention. As shown in FIG. 5, once the information exchange operation between EFBs is initiated on an exemplary transferring EFB 200 (hereafter designated 200 (A)), the individual cockpit flight crew member in control of the transferring EFB 200(A) from which the information is to be sent may be provided an opportunity to designate which individual, or group of, receiving EFBs 200 (hereafter designated 200(B)) are to receive the transferred information. This capability is shown in exemplary manner when, once the information exchange operation is initiated by depressing the PUSH button displayed in exemplary manner in FIG. 4 in the lower user data and system interface area 230, the menu button configuration in the lower user data and system interface area 230 changes to that shown in exemplary manner in FIG. 5. The individual cockpit flight crew member in control of the transferring EFB 200(A) is afforded an opportunity to select one or more of the destination locations such as, for example, pilot, co-pilot, flight engineer or other and then by selecting a continue or like labeled button to proceed to the next step in the information exchange operation.

Figure 6:
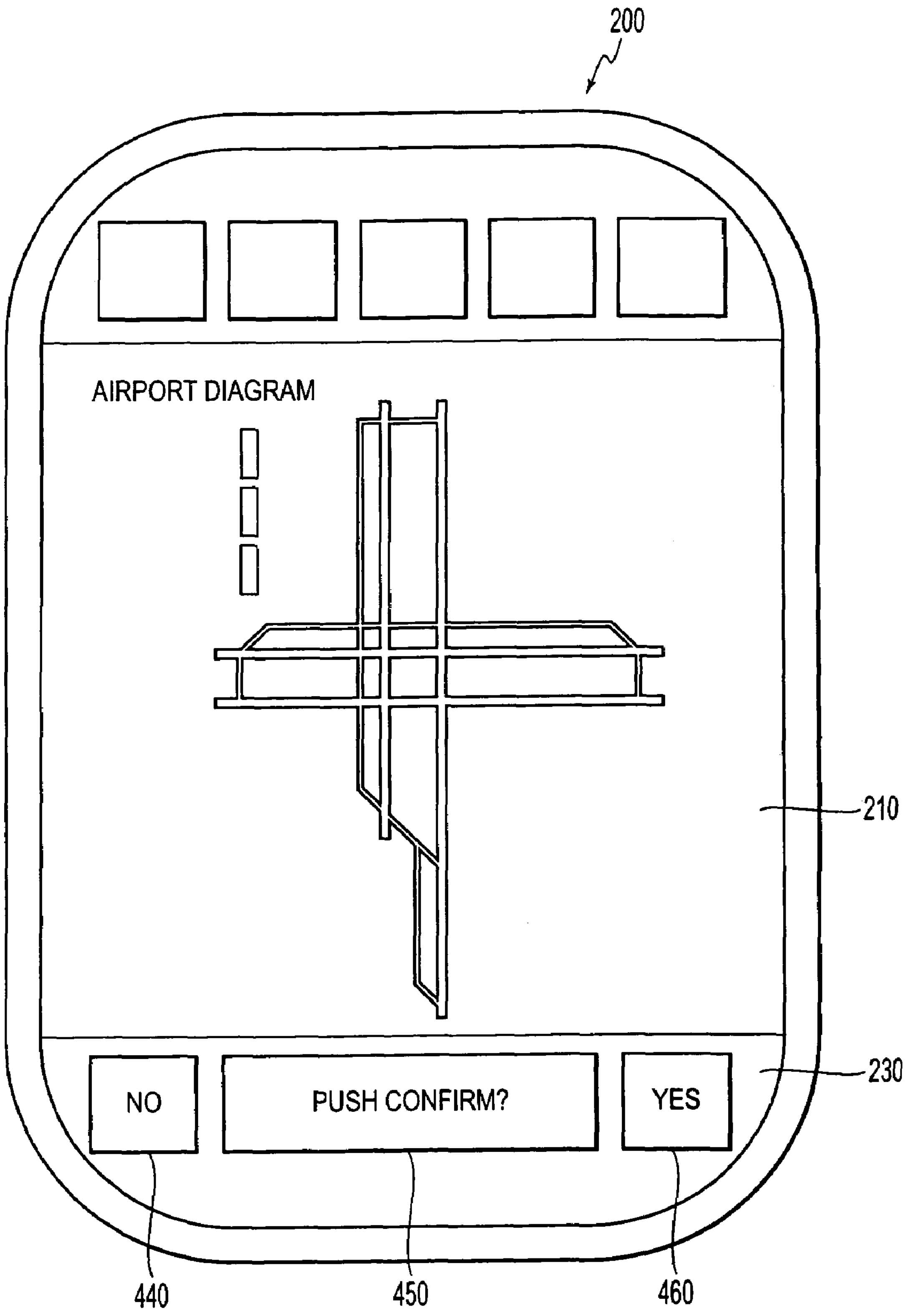
FIG. 6 illustrates a fourth view of an exemplary embodiment of an EFB as an example of a portable electronic data storage and display device usable with the systems and methods according to this invention.

FIG. 6 illustrates a fourth view of an exemplary embodiment of an EFB 200 as an example of a portable electronic data storage and display device usable with the systems and methods according to this invention. As shown in exemplary manner in FIG. 6, once the information exchange operation between EFBs is initiated on the exemplary transferring EFB 200(A), and the individual cockpit flight crew member in control of the transferring EFB 200(A) from which the information is to be sent has optionally been provided the opportunity to select one or more receiving locations, the menu button configuration in the lower user data and system interface area 230 changes again, this time from the standard multiple menu button configuration shown in exemplary manner in FIGS. 4 and 5 to an intermediate button configuration 440/450/460 designed to facilitate positive confirmation of the intent to transmit information to any one, or all, other individual flight crew members' receiving EFBs 200 (B), as previously optionally selected. This confirmation option is intended to enhance safety and security of aircraft operations during critical phases of flight by minimizing potential for erroneous information transmission thereby causing the display of a receiving EFB 200(B) to unexpectedly change.

In the various exemplary embodiments of the systems and methods according to this invention, once the individual cockpit flight crew member in control of the transmitting EFB 200(A) has depressed the PUSH button or in an intermediate step then selected from a menu of receiving EFBs 200(B), the PUSH Confirmation Dialog, shown in exemplary manner 440/450/460 in FIG. 6, is displayed. The objective of this step in the system and method is to ensure that the individual cockpit flight crew member in control of the transmitting EFB 200(A) is afforded the opportunity to positively confirm the intent to transmit information to a receiving EFB 200(B) by depressing an exemplary YES button 460, or to cancel an erroneously entered PUSH command by depressing an exemplary NO button 440. Element 450 is, in this example, simply a dialog box, not a button.

When the exemplary YES button 460 is depressed in response to the exemplary PUSH Confirmation Dialog, information regarding the specific page of data which is selected and optionally displayed on the primary display area 210 of the transmitting EFB 200(A) is sent across a wired or wireless data transfer connection to one or more receiving EFBs 200 (B). The receiving EFBs 200(B) process the information to select the identical page from the data storage unit each individual receiving EFB 200(B) to display that data reference page on the primary display area of the receiving EFB 200(B) and then process that page for display, completing the PUSH (information exchange) operation.

In the event that the individual cockpit flight crew member operating the transmitting EFB 200(A) erroneously initiates a PUSH operation by depressing the PUSH button in the selected upper or lower user data and system interface areas 220,230, that individual cockpit flight crew member is provided an option to cancel the PUSH operation and halt any data transfer, as outlined above, by depressing the exemplary NO button 440. In such case, the overall display area of the exemplary transmitting EFB 200(A) returns to a state where the menu buttons 420,430 in the upper and lower user data and system interface areas 220,230 are hidden awaiting further manipulation of the overall display screen.

To enhance safety by ensuring that a positive response is required by the individual flight crew member manipulating the transmitting EFB 200(A), a certain physical distance represented by the dialog box 450 in FIG. 5, is preferably provided between the NO (cancel) button 440 and the YES (confirm) button 460 thus reducing the potential for inadvertent action and mistaken display on a receiving EFB 200(B) of data that was not intended to be forwarded, nor that is required for the specific phase of flight in which the aircraft is being controlled.

As an option, in addition to information regarding the specific page to be displayed on the receiving EFB 200(B) being processed, automatic display of the menu buttons 420, 430 in the upper and lower user data and system interface areas 220,230 of the receiving EFB 200(B) could be provided in order to facilitate quick adjustment or manipulation of the data displayed on the receiving EFB's 200(B) primary data display area when the individual flight crew member in control of the receiving EFB 200(B) has the opportunity to momentarily remove his or her hands from the flight controls in order to adjust the page displayed to their specific use. It is important to note that all of the normal functionality is available in the receiving EFB 200(B) despite that the data currently displayed on the receiving EFB 200(B) was remotely selected. The individual cockpit flight crew member in control of the receiving EFB 200(B) can manipulate currently displayed data, or move to other data as convenient and appropriate. This ability of the individual cockpit flight crew member in control of the receiving EFB 200(B) in the case of interactive functions, such as, for example, checklist functions, affords the individual cockpit flight crew member the capability to make any interactive data input that is necessary and such data input will be displayed on each individual cockpit flight crew member's EFB 200 displaying the same data reference page, i.e., checklist.

It should be appreciated that while the processing described herein occurs primarily internal to transmitting and receiving EFBs 200(A),200(B) of individual cockpit flight crew members, some data processing could occur in a separate LAN server which is installed to support processing and optional storage of data transmitted between EFBs 200 across an exemplary cockpit-installed private local area network (FIG. 1). Additionally, a data storage function for CRM review could be internal to the EFBs, supported by the LAN server, or shared between all available data storage components.

Further, it should be appreciated that, given the required inputs, the processing outlined in the systems and methods according to this invention can be implemented through software algorithms, hardware circuits, or any combination of software and hardware control elements resident in the individual portable electronic data storage and display and EFB devices and/or as supported in a separate optional LAN server.

Any data storage contemplated for the described exemplary embodiments can be implemented using any appropriate combination of alterable, volatile or non-volatile memory, or non-alterable, or fixed memory. The alterable memory, whether volatile or non-volatile, can be implemented using any one or more of static or dynamic RAM, a floppy disk and disk drive, a writable or re-writable optical disk and disk drive, a hard drive, flash memory or any other like memory medium and/or device. Similarly, the non-alterable or fixed memory can be implemented using any one or more of ROM, PROM, EPROM, EEPROM, and optical ROM disk, such as a CD-ROM, or DVD-ROM disk and disk drive or any other like memory storage medium and/or device.

Figure 7:
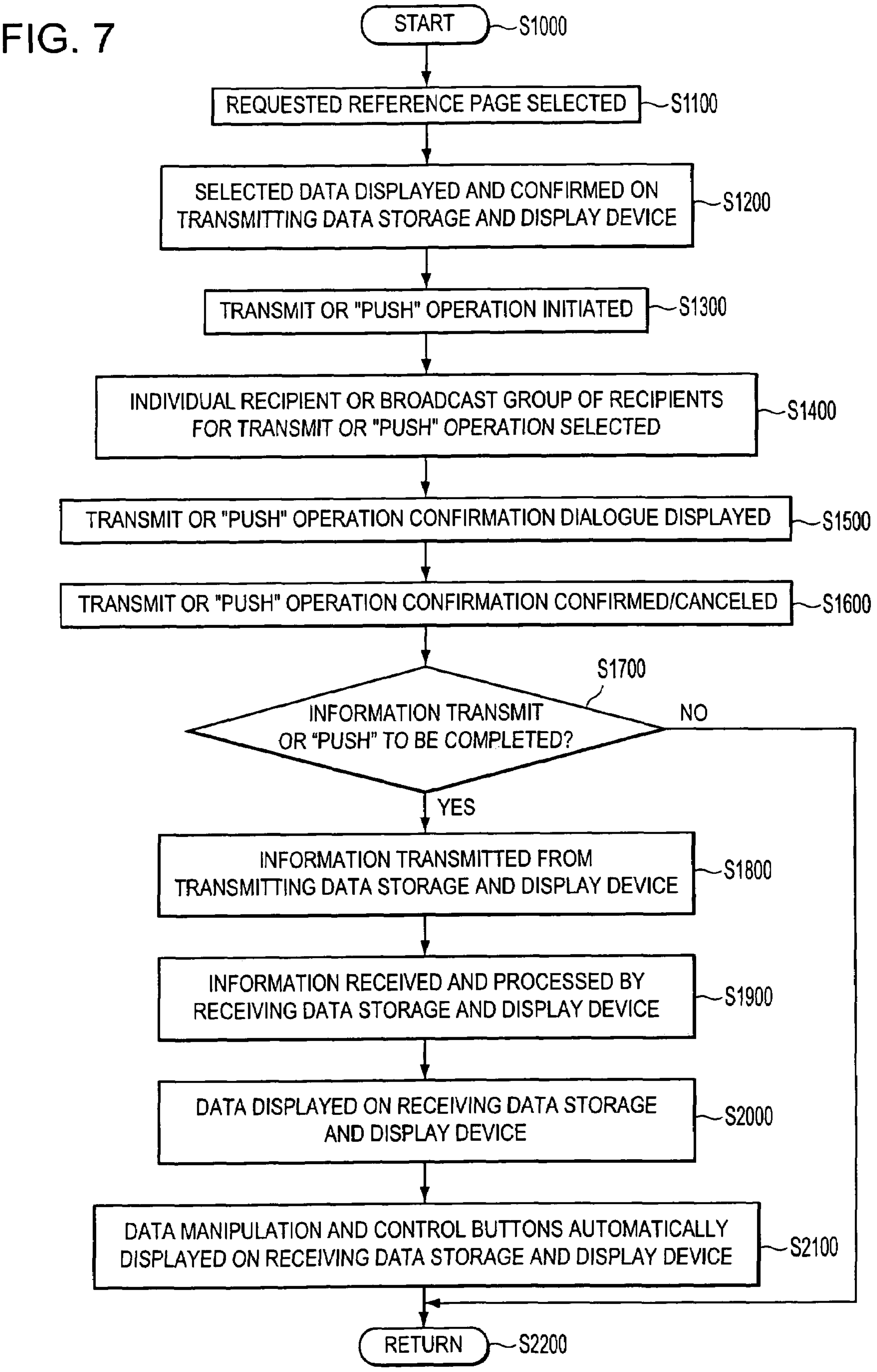
FIG. 7 is a flowchart of an exemplary embodiment of a method for crew interaction and coordination employing multiple portable electronic data storage and display devices according to this invention.

FIG. 7 is a flowchart of an exemplary embodiment of a method for crew interaction and coordination employing multiple portable electronic data storage and display devices according to this invention.

As shown in FIG. 7, operation begins at step S1000 and continues to step S1100, where a crew member uses the user interface of his or her portable electronic data storage and display device to select a reference page of data requested by another crew member. The operation continues to step S1200.

In step S1200, the crew member in control of the transmitting portable electronic data storage and display device reviews the data displayed based on the selection made in step S1100 and confirms that it is the reference page of data which was requested by the other crew member who may be otherwise unable to manipulate the controls of a receiving portable electronic data storage and display device. The operation continues to step S1300. It should be appreciated that in some embodiments, step S1200 may be omitted.

In step S1300 (having confirmed that the correct reference page of information has been selected when step S1200 is present in the method), the crew member in control of a transmitting portable electronic data storage and display device initiates a transmit or PUSH (information exchange) operation on his or her portable electronic data storage and display device by selecting a "PUSH" or similarly labeled command button on the user interface of, or otherwise available in, the portable electronic data storage and display device. The operation continues to optional transmitting step S1400 or directly to step S1500.

It should be appreciated that verbal interaction between individual crew members may be required to confirm the requests for information.

In optional step S1400, the crew member in control of the transmitting portable electronic data storage and display device is afforded the opportunity to select one or more recipients of the information to be transmitted from among a list of potential available recipients. The operation continues to step S1500.

In step S1500, in response to transmit or PUSH (information exchange) operation initiation which occurred in step S1300, or after recipient selection is effected in optional step S1400, a confirmation dialog is displayed. The operation continues to step S1600.

In step S1600, the crew member in control of the transmitting portable electronic data storage and display device confirms or cancels the transmit or PUSH (information exchange) operation by positively selecting an appropriately labeled option from those presented in the confirmation dialog. This step is designed to reduce the possibility of erroneous or inadvertent data transfer between portable electronic data storage and display devices. The operation continues to step S1700.

In step S1700, a determination is made whether the operation, i.e., information exchange between portable electronic data storage and display devices, is to be completed.

If a determination is made in step S1700 that the information exchange is not to be completed, the operation proceeds directly to step S2200.

If a determination is made in step S1700 that the information exchange is to be completed, the operation continues to step S1800.

In step S1800, transfer of information identifying the data reference page selected and optionally displayed on the transmitting portable electronic data storage and display device as well as any necessary display parameters such as, for example, zoom or scale, occurs from a transmitting portable electronic data storage and display device to one or more receiving portable electronic data storage and display devices of other crew members across a data transfer connection. The operation continues to step S1900.

In step S1900, one or more receiving portable electronic data storage and display devices processes the information received across the data transfer connection from the transmitting portable electronic data storage and display device regarding the data reference page which was initially requested, and which may be currently displayed on the data display area of the transmitting portable electronic data storage and display device. The processor selects the page to be displayed from data stored in the receiving portable electronic data storage and display device. The operation continues to step S2000.

In step S2000, the data reference page which was requested is displayed on the one or more receiving portable electronic data storage and display devices in the same format as that requested. The operation continues directly to step S2200 or alternatively to optional step S2100.

If operation proceeds to optional step S2100, a user interface is automatically displayed to the user of the receiving portable electronic data storage and display device. This optional step allows the individual crew members in control of the one or more receiving portable electronic data storage and display devices to immediately manipulate and control the data displayed without an intervening step of having to manually activate hidden display-based menu buttons. The operation continues to step S2200.

In step S2200, the operation of the method stops. The method may then be repeated as desired for additional pages.

Although not specifically depicted, it should be appreciated that information regarding each, or all, of the steps of the method as delineated above may be recorded in any suitable storage device either internal to the individual portable electronic data storage and display devices or in a separate data storage unit optionally provided to receive such information directly from the individual portable electronic data storage and display devices or directly from any suitable interface with the data transfer connection. Such stored information is available to be later optionally downloaded for use, for example, for CRM review for such beneficial purposes as efficiency evaluation, procedures training, event reconstruction, mishap investigation or other like beneficial purpose.

While this invention has been described in conjunction with the exemplary embodiments outlined above, these embodiments should be viewed as illustrative, and not limiting. Various modifications, substitutes or the like are possible within the spirit and the scope of the invention.

What is claimed is:

1. A system for facilitating crew interaction and coordination, comprising:

at least two portable electronic data storage and display devices positioned remotely from one another, each of which includes:

a data storage unit;

a data display unit;

a user interface;

a data input/output interface; and a data processor that processes at least one of user inputs received through the user interface and automated inputs received through the data input/output interface to select data stored in the data storage unit and display the selected data on the data display unit; and a data transfer device that links the at least two portable electronic data storage and display devices to form a data communications link between the data input/output interfaces of the at least two portable electronic data storage and display devices, wherein information regarding data selected at a first of the at least two portable electronic data storage and display devices is transmitted to and received by at least a second of the at least two portable electronic data storage and display devices, and the received information is processed by the data processor in the at least the second of the at least two portable electronic data storage and display devices so that the at least the second of the at least two portable electronic data storage and display devices automatically displays data recovered from the data storage unit of the at least the second of the at least two portable electronic data storage and display devices.

2. The system of claim 1, wherein data is displayed on the display unit of the first of the at least two portable electronic data storage and display devices and identical data to that displayed on the first of the at least two portable electronic data storage and display devices is displayed on the at least the second of the at least two portable electronic data storage and display devices with no user input through the user interface of the at least the second of the at least two portable electronic data storage and display devices.

3. The system of claim 1, wherein the user interface is a normally hidden portion of the data display unit, and is activated by initial user input of touching the data display unit.

4. The system of claim 3, wherein the user interface of the at least the second of the at least two portable electronic data storage and display devices is automatically activated when data is displayed on the display unit of the first of the at least two portable electronic data storage and display devices and identical data to that displayed on the first of the at least two portable electronic data storage and display devices is displayed on the at least the second of the at least two portable electronic data storage and display devices with no user input through the user interface of the at least the second of the at least two portable electronic data storage and display devices.

5. The system of claim 1, further comprising a recipient selection device wherein the at least the second of the at least two portable electronic data storage and display devices designated to receive the information regarding data selected at the first of the two at least two portable electronic data storage and display devices can be selected from among a plurality of at least a second of the at least two portable electronic data storage and display devices on the first of the at least two portable electronic data storage and display devices before the information is transmitted to and received by the at least the second of the at least two portable electronic data storage and display devices designated.

6. The system of claim 1, further comprising a confirmation device requiring positive confirmation of intent to transmit information regarding data to be displayed from the first of the at least two portable electronic data storage and display devices to the at least the second of the at least two portable electronic data storage and display devices.

7. The system of claim 1, wherein when identical data is displayed on at least the first and the second of the at least two portable electronic data storage and display devices and that identical data provides for interactive individual user coordination with the data display, user input via the user interfaces of any display unit on at least one of the first and the second of the at least two portable electronic data storage and display devices will result in the display units of at least the first and the second of the at least two portable electronic data storage and display devices displaying identical data being coincidentally and immediately updated to reflect the changes to any interactive data displayed on the display units of any of the at least first and second of the at least two portable electronic data storage and display devices.

8. The system of claim 1, wherein the data transfer device for linking the at least two portable electronic data storage and display devices is at least one of a permanently-installed and a temporary and a combination temporary/permanent cable connection.

9. The system of claim 1, wherein the data transfer device for linking the at least two portable electronic data storage and display devices is a wireless data transfer connection.

10. The system of claim 1, wherein the at least two portable electronic data storage and display devices positioned remotely from one another are Electronic Flight Bags.

11. The system of claim 1, further comprising a separate data storage unit for storing information regarding the information exchange between the at least two portable electronic data storage and display devices wherein such information can be directly received from at least one of the at least two portable electronic data storage and display devices and the data transfer device, the information being later downloadable for review in support of any beneficial purpose for which such information may be reviewed.

12. The system of claim 1, wherein the data transfer device for linking the at least two portable electronic data storage and display devices is a cockpit-installed private local area network.

13. The system of claim 12, further comprising a private local area network server to provide at least one of additional data storage capacity and additional data processing capability.

14. The system of claim 12, wherein the private local area network server is usable to store information regarding the information exchange between the at least two portable electronic data storage and display devices wherein such information can be directly received from at least one of the at least two portable electronic data storage and display devices and the data transfer device, the information being later downloadable for review in support of any beneficial purpose for which such information may be reviewed.

* * * * *